Oct. 30, 1962     A. T. FLOWER     3,060,786
NUT WITH MAGNETICALLY OPERATED DRIVING MEANS
Filed May 18, 1960     2 Sheets-Sheet 1
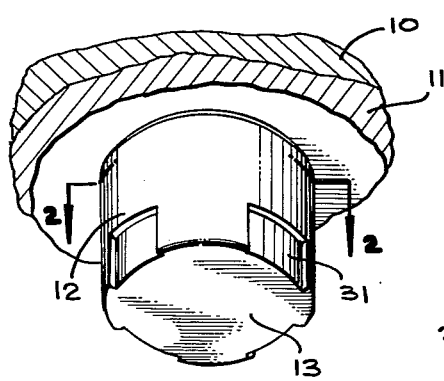
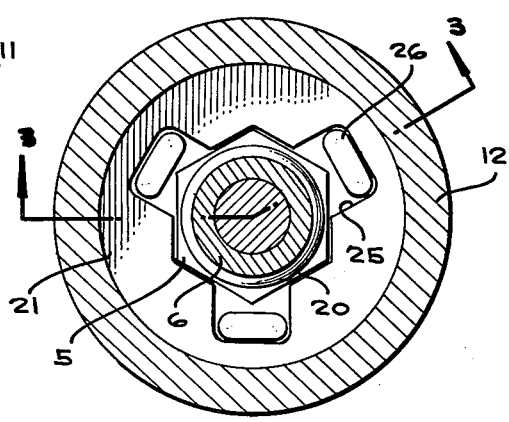
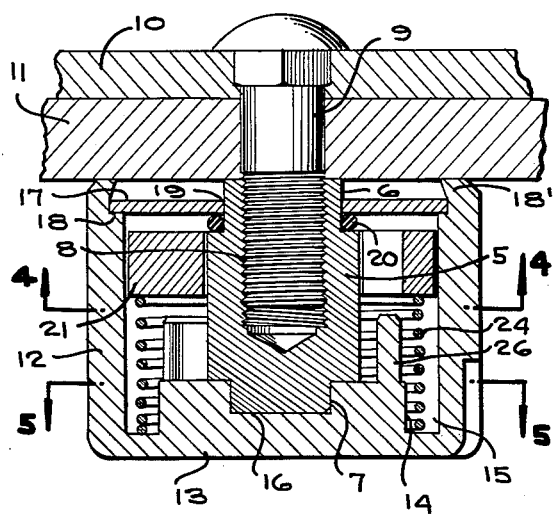
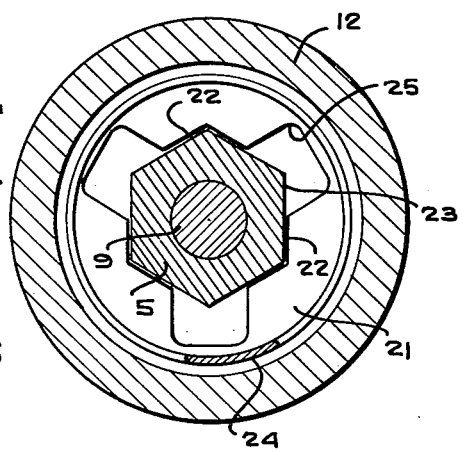
INVENTOR.
ARCHIBALD T. FLOWER
BY Ralph Burch
ATTORNEY Oct. 30, 1962    A. T. FLOWER    3,060,786
NUT WITH MAGNETICALLY OPERATED DRIVING MEANS
Filed May 18, 1960    2 Sheets-Sheet 2
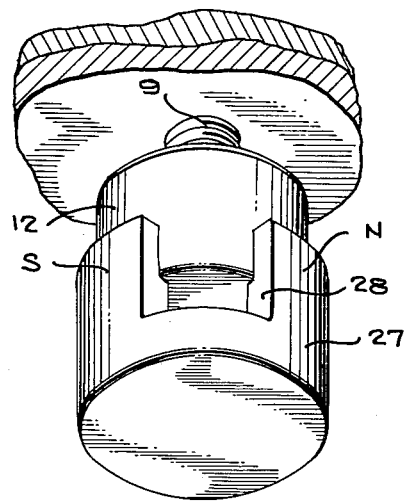
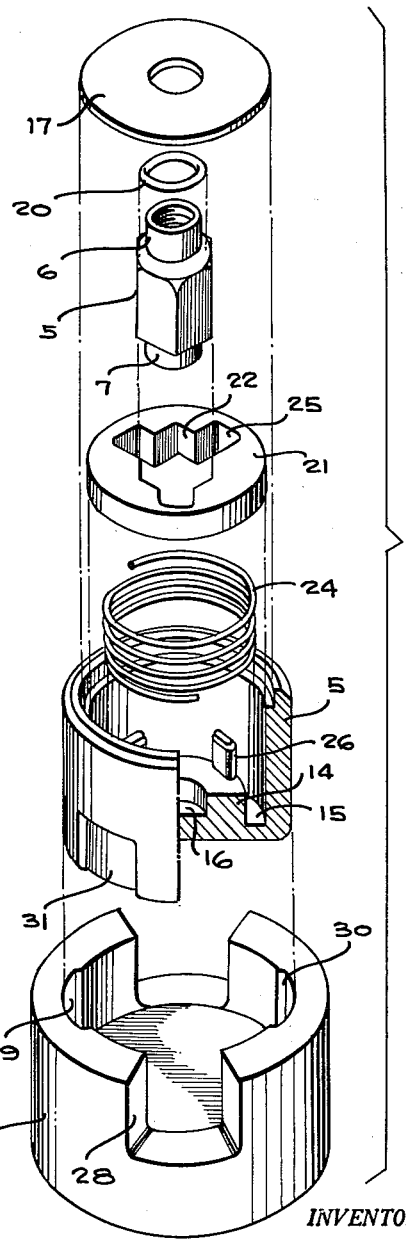
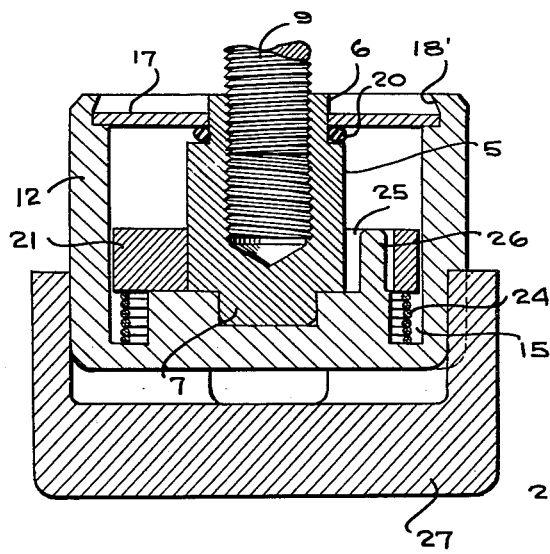
INVENTOR.
ARCHIBALD T. FLOWER
BY Ralph Burch
ATTORNEY

United States Patent Office 3,060,786
Patented Oct. 30, 1962

3,060,786
NUT WITH MAGNETICALLY OPERATED
DRIVING MEANS
Archibald T. Flower, Glenside, Pa.
(Queen St. and Ivy Hill Road, Philadelphia 18, Pa.)
Filed May 18, 1960, Ser. No. 29,942
1 Claim. (Cl. 85—32)

This invention relates to a tamper-proof nut which may be employed as a fastening device for various purposes such as the securing of closures against unauthorized opening.

It is an object of the invention to provide a nut enclosed in a casing which is normally freely rotatable with respect to the nut and magnetically operable means within the casing to operatively connect the casing and nut for rotation together.

A further object of the invention resides in providing a clutch member having constant interfitting engagement with the nut which is slidable longitudinally of the nut and under the influence of a magnetic tool will be moved into clutching engagement with the casing to establish rotative connection between the casing and nut.

A still further object of the invention resides in providing a compression coil spring between the casing and clutch member normally moving the clutch member axially of the nut to hold the clutch member in released position.

A still further object of the invention resides in providing a single clutch member which will quickly and positively establish operative connection between the casing and nut under the influence of a magnetic force.

Another object of the invention resides in providing a device composed of relatively few parts, that is simple and reliable in operation and inexpensive to manufacture.

Other objects and advantages of the invention will be apparent during the course of the following description.

In the accompanying drawings, forming a part of this specification and in which like numerals are employed to designate like parts throughout the same, FIG. 1 is a perspective view of the tamper-proof nut,
FIG. 2 is a section taken on line 2—2 of FIG. 1,
FIG. 3 is a section taken on line 3—3 of FIG. 2,
FIG. 4 is a section taken on line 4—4 of FIG. 3,
FIG. 5 is a section taken on line 5—5 of FIG. 3,
FIG. 6 is a perspective view of the magnetic tool applied to the nut,
FIG. 7 is a sectional view similar to FIG. 3, showing the nut and casing in operative engagement, and
FIG. 8 is a perspective view showing the parts in separate relation.

Referring to the drawings, wherein for the purpose of illustration a preferred embodiment of the invention is shown, the numeral 5 denotes a nut of hexagonal shape in cross section having reduced circular ends 6 and 7 and a screw threaded bore 8 for threaded engagement with a bolt 9 employed to fasten members 10 and 11 together.

A circular casing 12 is disposed around the nut having a closed outer end 13 which is formed with an annular boss 14 on the inner side defining a circular groove 15 between the wall of the casing and side of the boss. The center of the boss is formed with a recess 16 in which the outer reduced end 7 of the nut is journaled permitting free rotation of the casing with respect to the nut. The inner end of the casing is closed by a brass disk 17 which is seated on a shoulder 18 formed in the wall of the casing and is held in position by swaging the wall of the casing, as at 18'. The center of disk 17 has an opening 19 to receive the inner reduced end 6 of the nut and an O-ring 20 is positioned on the end 6 beneath the disk to effect a seal between the disk and nut, but permits free rotation.

A clutch member 21 is fitted within the casing having a central opening provided with angular faces 22 for interfitting engagement with the angular faces 23 of the nut whereby the clutch member rotates with the nut. The clutch member is free to slide longitudinally of the nut and is normally held in the inner end of the casing by a compression coil spring 24 having one end seated in the groove 15 and its opposite end in bearing engagement with the clutch member. The central opening of the clutch member is provided with a series of spaced radial slots 25 adapted to engage upstanding lugs 26 formed on the boss 14 when the clutch member is moved towards the outer end of the casing thereby operatively connecting the casing and clutch member together.

The casing is constructed of any suitable non-magnetic material having the requisite strength such as "Zamak" while the clutch member is constructed of a magnetic material such as stainless steel or other corrosion resistant magnetic material. A magnetic tool for actuating the clutch member, as shown in FIG. 6, consists of a cylinder 27 closed at one end which is transversely slotted, as at 28, to form two opposed pole pieces adapted to engage over the outer end of the casing. The inner wall of the cylinder 27 is provided with opposed grooves 29 forming ribs 30 which engage in grooves 31 formed in the sides of the casing when the cylinder is fitted on the outer end of the casing.

In operation, when the nut 5 is tight on the bolt 9, the clutch member 21 is held out-of-engagement with the lugs 26, by spring 24, allowing the casing 12 to freely rotate without turning the nut. Thus, it will be seen the fastener cannot be released until the clutch member is moved to operatively connect the casing with the nut and in order to move the clutch a magnetic tool, such as shown in FIG. 6, must be fitted over the outer end of the casing to produce a magnetic force to draw the clutch member 21 against the compression force of spring 24 until lugs 26 engage with slots 25 of the clutch member, thereby operatively connecting the casing and clutch member together. With the clutch member engaged with the lugs rotation of the casing will rotate the clutch member and thereby rotate the nut to release the fastener.

It is to be understood that the form of my invention herein shown and described is a preferred example of the same and changes in the shape, size and arrangement of the parts may be made without departing from the spirit of the invention.

Having thus described my invention, I claim:

A magnetically operable fastening device comprising a nut having a non-circular body and having a circular end, a rotatable casing of non-magnetic material having a cylindrical internal surface surrounding said nut having an end wall provided with a central circular recess to receive the circular end of said nut, means opposite said end wall and engaging said nut to maintain the nut in said casing, a clutch ring of magnetic material slidably mounted on said nut having a non-circular inner periphery in interfitting sliding engagement with the non-circular body of said nut, projections on the end wall of said casing for interfitting engagement with slots formed in said clutch ring when the clutch ring is moved by magnetic force towards the end wall of the casing and means normally urging said clutch ring axially of said nut to disengage said clutch ring from said projections.

References Cited in the file of this patent

UNITED STATES PATENTS

| | | |
|---|---|---|
| 1,645,917 | Maszczyk | Oct. 18, 1927 |
| 1,768,293 | Reed | June 24, 1930 |
| 1,916,225 | Kauffman et al. | July 4, 1933 |